July 5, 1960   R. F. KNEISLEY   2,944,197
RECTIFIER UNIT
Filed Aug. 18, 1958   2 Sheets-Sheet 1
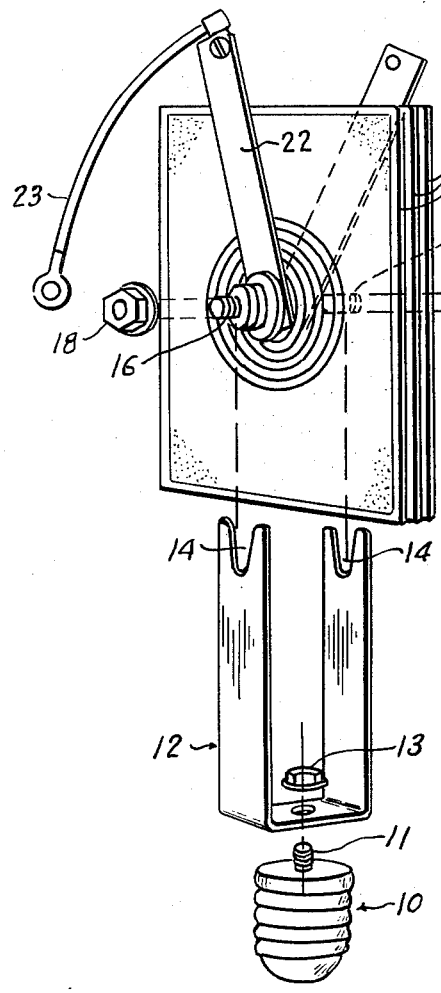
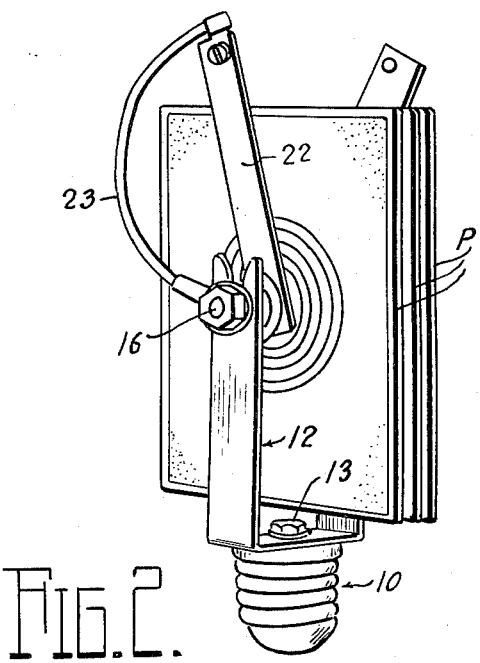
INVENTOR.
Richard F. Kneisley
BY
ATTORNEYS July 5, 1960 R. F. KNEISLEY 2,944,197
RECTIFIER UNIT Filed Aug. 18, 1958 2 Sheets-Sheet 2

INVENTOR.
Richard F. Kneisley
BY
ATTORNEYS

United States Patent Office 2,944,197
Patented July 5, 1960

2,944,197

RECTIFIER UNIT

Richard F. Kneisley, 1643 S. Cove Blvd., Toledo 6, Ohio

Filed Aug. 18, 1958, Ser. No. 755,708

4 Claims. (Cl. 317—234)

This application is a continuation-in-part of my copending application Serial No. 661,259, filed May 23, 1957, and now abandoned.

This invention relates to rectifiers for theater use and the like and is particularly directed to a replacement unit to convert rectifiers initially designed for rectification in gas-filled tubes to rectification in selenium or silicon cells.

Most theaters are presently equipped with gas-filled tube rectifiers to supply low voltage, high current D.C. for operation of the projector arc lamps. Such units are relatively inefficient and are subject to frequent breakdown because of failure of the filaments of the gas-filled tubes. The present invention has for its primary object to provide a simple and efficient replacement device in the form of a selenium or silicon rectifier unit which can be mounted in the sockets that are presently used to receive the gas-filled tubes. Such a replacement increases the output of a rectifier substantially and increases its efficiency.

Another object of the invention is to provide a device that is so simple that it can be installed by unskilled persons.

Other objects and advantages of the invention will become apparent from the following detailed description of a preferred form thereof, reference being had to the accompanying drawings, in which—

Figure 1 is an exploded perspective view showing the elements of the present invention separated in the interests of clarity;

Fig. 2 is a similar view of the parts shown in Fig. 1 assembled and in operating position.

Figure 3:
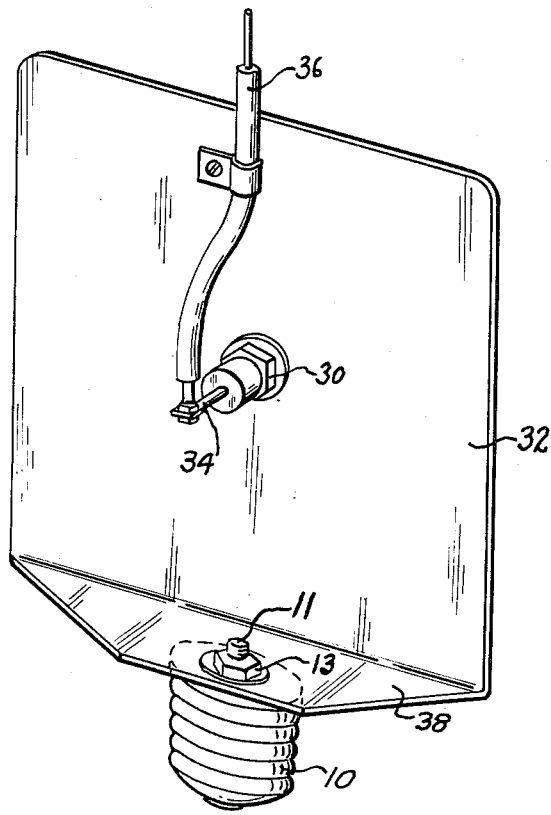
Fig. 3 is a perspective view of a modified form of the invention in which a molybdenum-silicon rectifier is used.

Referring to the drawings and particularly to Fig. 1 a rectifier unit of the present invention comprises a screw type base 10 which is of a size and thread pitch to be received in a common tube socket that normally receives a gas-filled rectifier tube. A screw 11 protrudes from the top of the base and is anchored therein.

A yoke 12 is received over the base and comprises a U-shaped member having its free ends extending upwardly from the base and its bight portion received over the screw 11 and adapted to be clamped into position with respect to the base by a nut 13. By this means the position of the yoke with respect to the base can be changed to align the rectifier unit in any desired position.

The upper ends of the U-shaped yoke 12 are slotted as at 14 and a rectifier unit of the selenium type comprising a series of properly related and coated plates P mounted on a common shaft 16 is received in the slots 14. The rectifying unit is held in place by end nuts 18 threaded over suitable threads on the ends of the shaft 16 of the rectifier unit.

Electrical connections to the plates may be made in any suitable manner but it is preferred that the positive side of the rectifier through upstanding contact 22 be connected by a wire through the yoke 12 to the shell contact of the base 10. In this way it is not necessary for the operator to disturb the electrical connections since the positive side of the gas-filled tube was similarly connected.

Another upstanding contact is provided which carries the negative side of the circuit of the rectifier.

In the operation or use of the form of the invention so far described, it is only necessary for the operator to unscrew the gas-filled tube that was previously received in the socket of the rectifying unit. He then dismounts the plates and shaft 16 from the yoke 12 and threads the base 10 and its accompanying yoke into the socket. If the yoke is not properly aligned in the housing of the entire device he then loosens the nut 13 on the screw 11 and turns the yoke 12 to the properly aligned position. He thereupon tightens the nut 13 to anchor the yoke with respect to the seated base. The rectifying plates P and their mounting shaft 16 are then dropped into the slots 14 of the yoke 12 and the end nuts tightened on the shaft to clamp the plate assembly in the yoke. Prior to tightening the end nut through which the positive connection is made, a washer electrically connected to the end of a wire 23 may be slipped over the shaft 16 for purposes of establishing the positive plate connection to the yoke.

It will be seen that the present replacement unit may be installed in any location that would normally contain a gas-filled rectifying tube. It will also be seen that the number of rectifying plates may be increased or decreased to provide a greater or lesser capacity for the rectifier.

It has been found in service that replacing four gas-filled tubes with four of the selenium plate type units increases the output of a rectifier from 42 amperes at 28 volts to a rating of 50 amperes at 35 volts. The efficiency of the selenium rectifier unit is much higher than the efficiency of the gas-filled tubes that were replaced.

A modified form of the invention is shown in Fig. 3 in which a silicon rectifier is used in place of the selenium unit above described. Generically, both the selenium and silicon cells can be referred to as dry-type rectifiers. The small hermetically sealed silicon cell is very efficient for forward currents in the order of 6 amperes D.C. The case of the cell is designated 30 and is bolted to a large rectangular bracket 32 which may be a thick copper body capable of carrying off the heat developed in the rectifier and forming one side of the rectifier circuit. The rectifier center terminal 34 is connected to the power take-off lead 36.

The bracket 32 is bent at right angles to form a mounting means 38 which is adjustably fixed to the base 10 by the nut 13 on the screw 11 as in the previously described form of the invention. Thus, the mounting means for the rectifier cell comprises a first portion that is adjustably fixed with respect to the base 10, and a second portion extending upwardly at right angles thereto on which the rectifier cell is carried. The mounting means and base are thus electrically connected to the case 30 of the rectifier cell.

In the operation and use of the form of the invention shown in Fig. 3, it is again only necessary for the operator to unscrew the gas-filled tube that was previously received in the socket of the rectifying unit. He then dismounts the plate 32 and its supporting or mounting means 38, either by loosening the nut 13 or by taking it off completely from the screw 11. He then threads the base 10 into the socket and, if the parts have not been disassembled but merely loosened, aligns the plate 32 in the proper position and holds it while tightening the nut 13. This anchors the mounting means 38 to the seated base in the desired location. It is necessary to provide the adjustable connection between the mounting means and the base for the reason that there is never sufficient room in the rectifier unit to turn the large plate 32 about the axes of the base to screw the rectifier home in the tube socket. Having seated and aligned the rectifier, the electrical connection 34—36 can be made and the device is ready for use.

While the invention has been disclosed in conjunction with specific forms and dispositions of the parts it should be expressly understood that numerous other modifications and changes may be made without departing from the scope of the appended claims.

What I claim is:

1. A rectifier unit adapted to replace a gas-filled tube comprising a threaded base for reception in a tube socket, a mounting means having a first portion adjustably mounted on said base and a second portion extending at right angles to said first portion, and a dry-type rectifier received in said second portion, said mounting means forming with said base one side of an electrical circuit including said rectifier.

2. A rectifier unit in accordance with claim 1 in which a silicon rectifier cell is carried by said second portion of said mounting means.

3. A rectifier unit adapted to replace a gas-filled tube comprising a threaded base for reception in a tube socket, a U-shaped yoke having its bight portion adjustably mounted on said base, and a series of selenium-rectifying plates demountably received between the arms of said yoke.

4. A unit in accordance with claim 3 and means to establish an electrical connection between one side of said plates and the outer body of said base.

References Cited in the file of this patent
UNITED STATES PATENTS 898,197    Dunwoody ------------ Sept. 8, 1908